(No Model.)

G. W. LOONEY, Sr.
Attachment for Reapers.

No. 232,648. Patented Sept. 28, 1880.

Witnesses:
G. H. Rennett.
J. Mueller.

Inventor.
Geo. W. Looney, Sen.
Geo. E. Frank
his Attorney.

UNITED STATES PATENT OFFICE.

GEORGE W. LOONEY, SR., OF FARMINGTON STATION, INDIANA.

ATTACHMENT FOR REAPERS.

SPECIFICATION forming part of Letters Patent No. 232,648, dated September 28, 1880.

Application filed July 20, 1880. (No model.)

*To all whom it may concern:*

Be it known that I, GEORGE W. LOONEY, Sr., a citizen of the United States, residing at Farmington Station, in Rush county, State of Indiana, have invented a new and useful Improved Attachment for Reapers for Collecting and Discharging Sheaves of Wheat or other like material, of which the following is a specification.

My invention relates to a sheaf collector and discharger for self-binding harvesters in which an inclined canvas carrier conveys the sheaves of wheat to an automatic dropper, which operates in conjunction with a bell-crank, a pawl, a ratchet, a trip-catch, and the collecting and discharging table; and the objects of my improvement are, first, to provide a self-binding harvester with a device for conveying the sheaves of wheat after being bound to an automatic discharger; second, to afford a means for collecting a given number of sheaves and automatically discharging them from the receiving-table.

These objects I accomplish by the devices illustrated in the accompanying drawings, in which—

Figure 1:
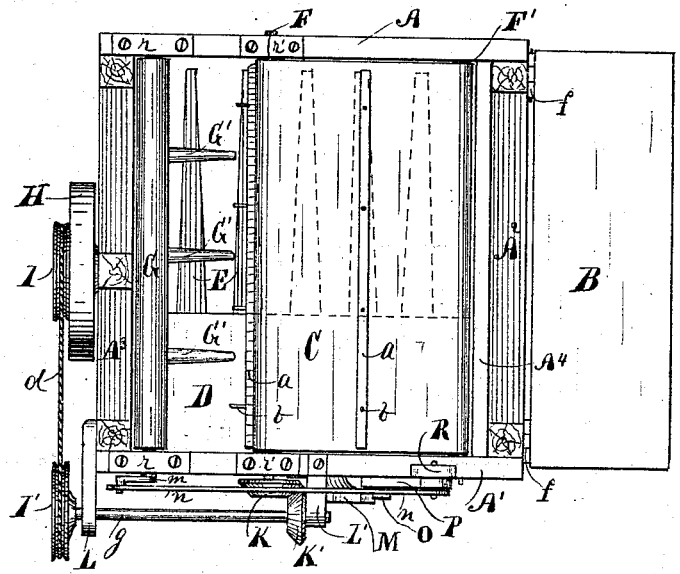
Figure 2:
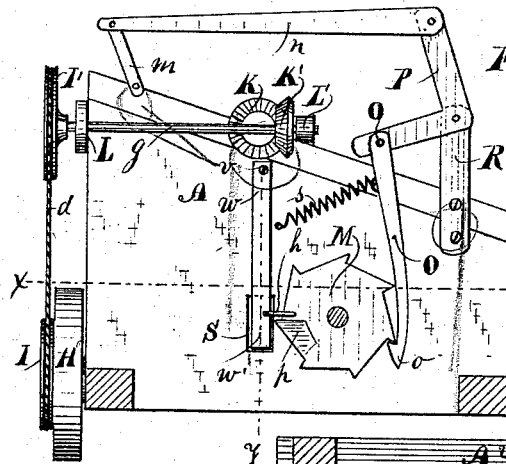
Figure 3:
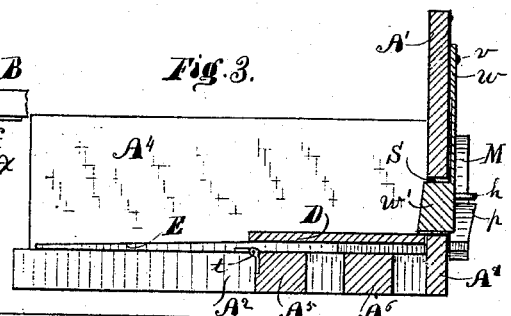
Figure 4:
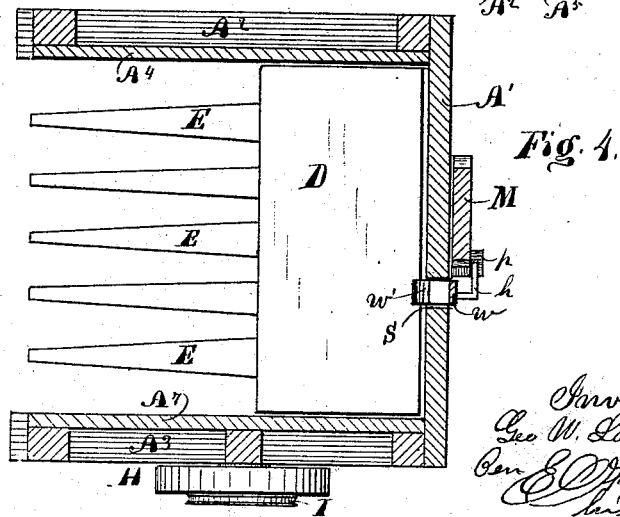

Figure 1 represents a top view of the entire device. Fig. 2 is a side elevation of the same. Fig. 3 is a vertical section taken at the line $y$, and Fig. 4 is a horizontal cross-section taken at the line $x\ x$ of Fig. 2.

Similar letters throughout the various views refer to like parts.

A A' A$^2$ A$^3$ A$^4$ A$^5$ A$^6$ A$^7$ represent the frame-work, sides, and sills of the device. At the front of the part A$^2$ the binding-board B is secured by hinges $f\ f$.

The endless canvas carrier C is provided with cross-slats $a\ a$, which are provided with spurs or hooks $b$, for catching hold of the bound sheaves and elevating them. The carrier C is mounted on the two rollers F F', which rotate in suitable bearings formed in the sides A A' of the frame.

The journal of the upper roller, F, projects beyond the frame A' on one side, and is provided with a miter or bevel wheel, K, which works in gear with the miter or bevel wheel K', said wheel K' being mounted on a shaft, $g$, and said shaft supported in suitable bracket-supports L L'. The end of the shaft $g$, which projects beyond the bracket L, is provided with sheave or chain wheel I', to which power is communicated by the rope or chain $d$, which operates on the sheave or chain wheel I, attached to the driving-wheel H, as shown, thus imparting motion to the rollers F F' and carrier-belt C.

At the rear side of the upper part of the frame is an oscillating or rock shaft, G, mounted in suitable bearings in the sides A A' of the frame, as shown in Fig. 1. Said rock-shaft is provided on one side with radiating fingers G' G' G', which extend from said rock-shaft G to a point near to the roller F of the carrier. The journal at one end of said rock-shaft G projects beyond the side A' of the frame, and is provided with a crank-arm, $m$, Figs. 1 and 2. This crank-arm $m$ is connected to the upright arm of the bell-crank P by the rod $n$, and the bell-crank P is pivoted to the upright R, which is made fast to the frame A'.

The lower arm of the bell-crank P is pivoted to the pawl O, and the lower end of the pawl is provided with a hook, $o$, to engage with the ratchet-teeth of the wheel M. The pawl O is held in contact with the ratchet-wheel M by a spring, $s$.

The ratchet-wheel may be provided with any number of teeth; but I prefer seven, one tooth of which has a side projecting ratchet, $p$, which is designed to move the arm $h$ of the trip $w\ w'$, so as to release the table D E and permit it to tilt up, thus discharging the six sheaves collected on the table; also, the one which caused the table to be tripped, as will be hereinafter described.

The trip is composed of the parts $w\ w'$, the part $w$ being a spring, and is attached to the side A' of the frame. The part $w'$ is a head, which projects through the hole S, formed in the side A' far enough to overlap the rear edge of the tilting table D E, as shown in Figs. 2, 3, and 4.

The tilting table is composed of the platform D and projecting fingers or bars E. This table is hinged, at $t$, to the sill A$^5$, and the rear end of the table is supported on the sill A$^6$, as shown in Fig. 3.

The operation of my improved attachment is as follows: The wheat being bound into sheaves on the binding-board B, is then carried by the carrier C *a b* upward, and each sheaf is deposited on the fingers G′ of the rock-shaft G. The weight of the sheaf causes the fingers G′ to be forced downward until the sheaf is deposited on the table D E. At the same time that the sheaf is turning down the fingers G′ the rock-shaft G is rotated, causing the crank *m* to move the rod *n* forward, and the rod operates the bell-crank, causing the pawl O to move upward, the hook *o* of the pawl rotating the ratchet-wheel M the distance of one tooth of the ratchet. As the sheaf drops onto the table D E the spring *s* draws down the lower arm of the bell-crank, and also holds the pawl O in contact with the ratchet-wheel, thus causing the rock-shaft G to again assume its position, as shown in Fig. 1, ready for the next sheaf, to repeat the operation. The operation is thus continued until six bound sheaves have been deposited on the table, when the seventh sheaf turns the rock-shaft G. The side ratchet, *p*, of the wheel M moves the arm *h* away from the side of the wheel, carrying with it the trip *w′* until the rear end of the table D E is released, when the six sheaves on the table and the one that tripped the table are all deposited on the ground, after which the predominance of weight at the rear end of the table D E causes it to return to the position shown in Figs. 3 and 4. At the same time the edge of the table forces the head *w′* of the trip back until the table is below it, when the trip *w′* again springs forward and prevents the table from tilting until again released, as before described.

It is obvious that the trip *w′* may be moved by hand at any time, for the purpose of discharging sheaves of wheat at other points than at the regular places of deposit.

What I claim as new, and desire to secure by Letters Patent, is—

1. In an attachment for self-binding harvesters, the combination of the carrier C, the rock-shaft G, with fingers G′ and crank *m*, the rod *n*, the bell-crank P, the pawl O, the spring *s*, the ratchet-wheel M, with side ratchet, *p*, the trip *w w′*, and tilting table D E, as and for the purpose specified.

2. In an attachment for self-binding harvesters, the combination of the trip *w w′*, with arm *h*, the ratchet-wheel M, with side ratchet, *p*, and the tilting platform D E, as and for the purpose specified.

3. The rock-shaft G, with fingers G′ and crank *m*, combined with the crank P, pawl O, spring *s*, and ratchet-wheel M, as and for the purpose specified.

In testimony whereof I have signed my name to this specification in the presence of two subscribing witnesses.

GEORGE W. LOONEY, Sr.

Witnesses:
E. O. FRINK,
GEORGE H. RENNETT.